Patented May 23, 1933

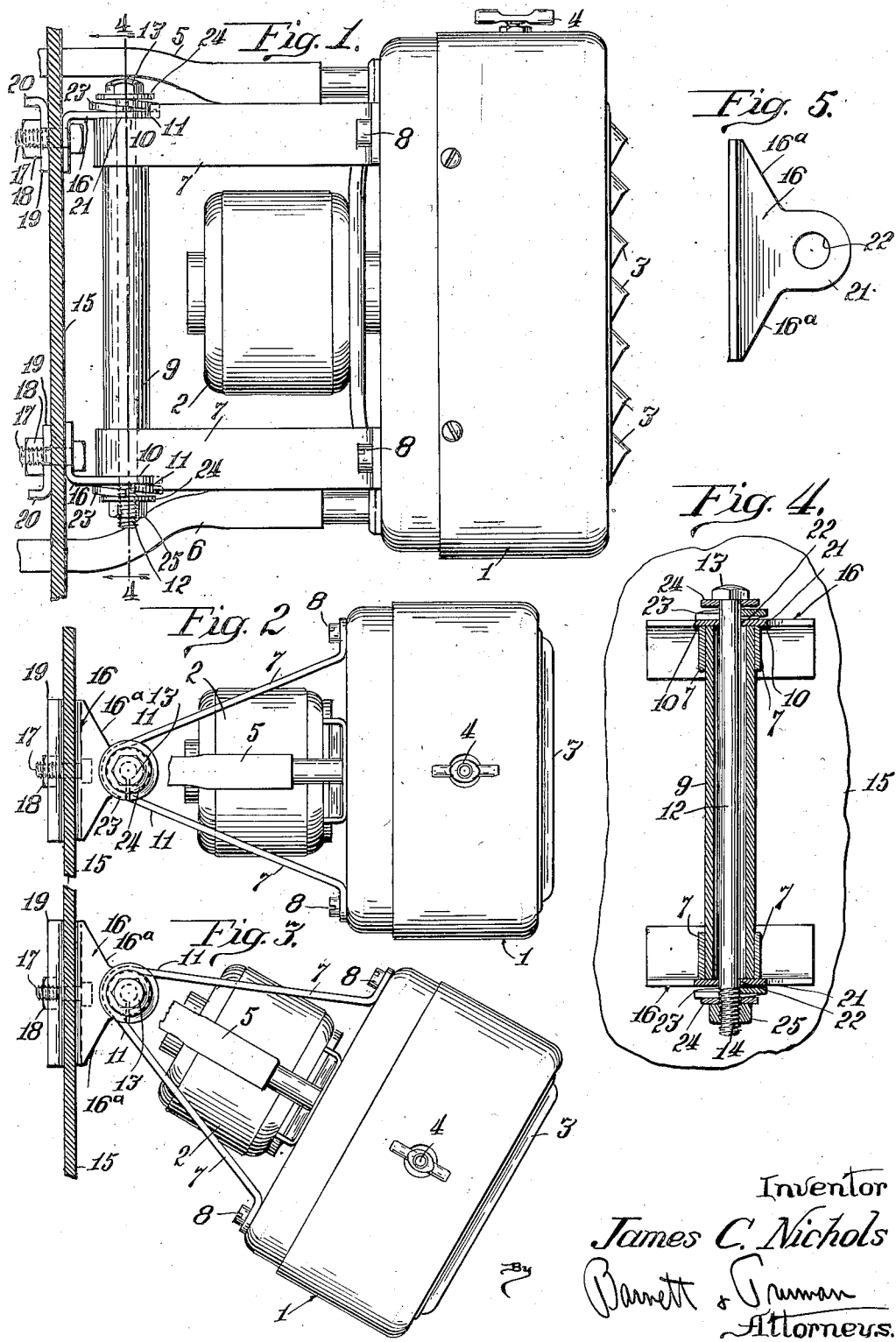

1,910,630

UNITED STATES PATENT OFFICE

JAMES C. NICHOLS, OF ELGIN, ILLINOIS

MOUNTING FOR AUTOMOBILE HEATERS

Application filed May 22, 1931. Serial No. 539,315.

My invention relates to a new and useful improvement in mountings for automobile heaters. My invention is directed particularly to a mounting for the type of automobile heater which is located on the dashboard and beneath the instrument board of a car, and is known to the trade as a hot water heater. This type of heater comprises a radiator core adapted to receive and return water from the water cooling system of the car engine with a fan or blower located behind it adapted to force air through it, thus transferring the heat from the water to the air and distributing it into the car. Due to the nature of automobile construction such heaters have usually been located under the instrument board and to one side of the driver's seat facing the adjoining seat.

Heaters of this kind have utilized adjustable fins or shutters mounted in front of the face of the radiator core for the purpose of directing the heated air to the right or left of its natural course. Such adjustment is desirable due to the facts that either the direct blast of warmed air is excessive to the person occupying the seat adjoining the driver, or an insufficient amount of heat is directed to the feet and legs of the driver which are exposed to the cold air that necessarily leaks through the openings in the toe board through which the operating pedals and levers are located. The fins and shutters used heretofore for this purpose have been unsatisfactory because as the angle, with relation to the natural path of the air emerging from the heater, at which the warmed air is desired to be directed, is increased, the obstruction caused by the fins or shutters is increased, thus diminishing the force and volume of the expelled air. This is demonstrated by a situation in which the operator wishes to direct the warmed air at right angles. In such a case the fins would have to be moved to a position at right angles to the natural flow which would be parallel to the face of the radiator core, and if mounted adjacent the core would completely close it up. With such device it is clearly impossible to direct the heated air to the driver's feet which are located under the instrument board to one side of and behind the face of the heater core.

The principal object of my invention is to provide a mounting for such a type of heater that will permit the entire heating unit to be manually pivoted over a wide angle so as to direct the entire flow of heated air as desired.

Another object of my invention is to provide such a mounting that will permit the heater unit to be so pivoted and will hold the heater unit in the adjusted position until again moved to another position by the operator.

Another object is to provide such a mounting that will securely brace the heater unit at all times in all positions.

Still another object is to provide such a mounting that is simple in mechanism, and easy to manufacture and install.

Numerous other objects and advantages of my invention will be apparent from the detailed description of the embodiment shown in the accompanying drawing.

Fig. 1 is a side elevation of a heating unit showing my improved mounting.

Fig. 2 is a plan view slightly reduced in size of the structure shown in Fig. 1.

Fig. 3 is a plan view of the structure shown in Fig. 2 moved in a horizontal plane so as to direct the flow of air at a different angle.

Fig. 4 is a section along line 4—4 of Fig. 1.

Fig. 5 is a plan view of one of the brackets 16.

Referring now more particularly to the drawing wherein like and corresponding parts are designated by similar reference characters throughout, 1 is a shell containing the radiator core, 2 is a motor for operating a fan located within the shell and behind the radiator core, 3 are vertically adjustable shutters, 4 is an air vent, 5 is a flexible intake hose leading from the engine water jacket to the radiator core, and 6 is a flexible return hose leading from the radiator core to the engine cooling system. These elements comprise the heating unit.

V-shaped arms or brackets 7 are attached to the top and bottom of shell 1 by means of bolts 8. Connecting the apices of and welded within the forks of these brackets 7 is a sleeve 9. The upper edge of the top brackets and the lower edge of the bottom brackets are partially cut away surrounding the sleeve 9 as at 10 forming shoulders 11. Within sleeve 9 and extending therefrom at each end is a bolt 12 with a head 13 at one end, and threads 14 at the other.

The entire unit is mounted underneath the instrument board and on the dashboard or partition 15, which separates the engine compartment from the riding compartment of the automobile, by means of L-shaped brackets 16 which are securely bolted to the dashboard by bolts 17 and the nuts 18, and are braced so that a greater bearing surface against the partition 15 is obtained by means of rectangular members 19, one edge of each of which is formed at right angles to the bearing surface as at 20 so as to strengthen the members against bending.

The edges 16a of the unit supporting portion of the brackets 16 converge to an extending semi-circular bearing surface 21 having a hole 22, through which passes the bolt 12. These bearing surfaces 21 fit within and bear against the cut away portions 10 of the brackets 7. A spring washer 23 and washer 24 are interposed on each end of the bolt 12 between the bearing parts 21 of the brackets 16 and the ends of the bolt. A nut 25 is threaded on the lower end of the bolt 12. By tightening the nut 25 the spring washers 23 are compressed, creating a friction between the bearing surfaces 21 of the L-shaped brackets 16 and the cut away portions 10 of the V-shaped brackets 7. This friction may be increased or decreased by tightening or loosening the nut 25 and will permit the unit to be pivoted to the desired position manually but will be sufficient to maintain the unit in such position until again moved. The shoulders 11 formed on the brackets 7 act as stops against which the converging edges 16a of the bracket 16 abut when the unit is pivoted to either of its extreme positions. These shoulders are so located on the brackets 7 that they will abut against the edges 16a before the shell can bump against the partition 15, thus protecting the unit from possible injury.

I claim:

1. A mounting for automobile heaters comprising rearwardly extending brackets fastened to the heater, a vertically extending member connecting said brackets, supporting brackets mounted on the dashboard, means for connecting said member and said supporting brackets in pivotal relationship and adjustable means for resisting pivotal movement.

2. A mounting for automobile heaters comprising rearwardly extending brackets fastened to the heater, a vertically extending sleeve connecting said brackets, supporting brackets mounted on the dashboard and a bolt extending through said supporting brackets and said sleeve joining them in horizontally pivotal relationship, and means mounted on said bolt for resisting such pivotal movement.

3. A mounting for automobile heaters comprising rearwardly extending brackets fastened to the heater, a vertically extending sleeve mounted on and connecting said brackets, supporting brackets mounted on the inside of the dashboard, means for strengthening said supporting brackets mounted on the outside of the dashboard, a bolt extending through said sleeve and said supporting brackets joining them in pivotal relationship and spring means mounted on said bolt for resisting such pivotal movement.

4. A mounting for automobile heaters comprising rearwardly extending brackets fastened to the heater, a vertically extending sleeve mounted on and connecting said brackets, supporting brackets having horizontally extending bearing surfaces, reinforcing plates, means for mounting said supporting brackets on the inside of the dashboard and said reinforcing plates on the outside opposite said supporting brackets, a bolt extending through and connecting said supporting brackets and said sleeve to allow the heater to be pivoted horizontally around said bolt and means mounted on said bolt for resisting such movement.

5. A mounting for automobile heaters comprising a pair of rearwardly extending V-shaped brackets the free ends of which are secured to the heater, a vertical sleeve member mounted within and connecting the forks of said brackets, a pair of supporting brackets mounted in vertical alignment on the inside of the dashboard of the automobile having horizontally extending bearing surfaces, a hole in each of said surfaces, a reinforced plate mounted on the outside of said dashboard opposite said supporting brackets, a bolt extending through the hole in the bearing surface of the top supporting bracket, the sleeve and the hole in the bearing surface of the bottom supporting bracket to allow the heater to be moved in a horizontal plane on said supporting brackets, and adjustable spring means mounted on said bolt adapted to resist such movement.

6. A mounting for automobile heaters comprising a pair of rearwardly extending V-shaped brackets the free ends of which are secured to the heater, a vertical sleeve member mounted within and connecting the forks of said brackets, shoulders on said brackets adjacent said sleeve formed by cutting away portions of each bracket surrounding said sleeve, a pair of supporting brackets mounted in vertical alignment on the dashboard of the automobile the edges of which are adapted to abut against said shoulders in certain positions, a bolt extending through and connecting said supporting brackets and said sleeve to allow the heater to be pivoted horizontally and means on said bolt for resisting such movement.

7. A mounting for automobile heaters comprising a pair of V-shaped brackets, the free ends of which are secured to the heater, a vertical sleeve member connecting the forks of said brackets, a pair of L-shaped brackets fixedly mounted in vertical alignment on the dashboard of the automobile, and a bolt extending through and connecting said L-shaped brackets and said sleeve to permit the heater to be pivoted in a horizontal plane.

8. A mounting for automobile heaters comprising a pair of brackets fastened to the rear of the heater each having rearwardly converging arms, a vertical sleeve member connecting the ends of said arms, L-shaped brackets mounted on the dashboard of the automobile in vertical alignment, a bolt extending through and connecting said L-shaped brackets and said sleeve member permitting the heater to be pivoted in a horizontal plane, and means for causing frictional engagement between said sleeve member and said brackets.

9. A mounting for automobile heaters comprising a pair of brackets fastened to the rear of the heater each having a pair of rearwardly converging arms, a vertical sleeve member connecting the ends of said arms and mounted thereon, a pair of L-shaped brackets mounted in vertical alignment on the dashboard of the automobile adapted to receive and support said sleeve member, a bolt comprising a shaft, a head and a threaded end extending through and connecting said L-shaped brackets and said sleeve member, a nut adapted to fit the threads of said bolt, spring washers fitted on said bolt between the head of said bolt and one of said L-shaped brackets and between said nut and one of said L-shaped brackets adapted to create frictional resistance against pivotal movement of said heater in a horizontal plane.

10. A mounting for automobile heaters comprising a pair of V-shaped brackets, the free ends of which are secured to the heater, a vertically positioned sleeve member fitting within and connecting the forks of said V-shaped brackets, shoulders on said brackets adjacent said sleeve formed by cutting away portions of each bracket surrounding said sleeve, a pair of L-shaped brackets securely fastened to the dashboard of the automobile having outwardly extending bearing surfaces adapted to fit within the said cut away portions, holes in said bearing surfaces, a bolt extending through and connecting said L-shaped brackets and said sleeve member, and means for resisting the movement of pivoting said heater in a horizontal plane about the axis formed by said bolt.

11. A mounting for a hot water heater for automobiles comprising rearwardly extending V-shaped brackets the free ends of which are secured to the heater, a vertical sleeve member connecting the forks of said brackets, supporting brackets mounted in vertical alignment on the dashboard of the automobile and a bolt extending through said supporting brackets and said sleeve member joining them in pivotal relationship, and means mounted on said bolt for resisting such pivotal movement.

12. A mounting for automobile heaters comprising rearwardly extending arms carried by the heater, a vertically positioned member connecting said arms, supporting means mounted on the dashboard, means for connecting said rearwardly extending arms in pivotal relationship to the supporting means carried by the dashboard, and adjustable means for resisting pivotal movement between the said arms and said supporting bracket means.

13. Supporting means for an automobile heater comprising a plurality of horizontally extending heater supporting brackets, a plurality of horizontally extending means for attaching said brackets to the dashboard of an automobile, bracing means adapted to be secured to the other side of said dashboard opposite said horizontally extending means, a vertically arranged pivotal connection interposed between each of said brackets and said horizontally extending means, and means for yieldably resisting movement about such pivotal connections.

JAMES C. NICHOLS.